(12) United States Patent
Wagner et al.

(10) Patent No.: US 7,191,992 B2
(45) Date of Patent: Mar. 20, 2007

(54) MEDICAL SUSPENSION SYSTEM WITH TWO SPINDLES

(75) Inventors: Jorg Wagner, Burghaun (DE); Klaus Steger, Eiterfled (DE); Yury Keselman, Beachwood, OH (US); David Jesurun, Euclid, OH (US); Roland D. Block, Painsville, OH (US)

(73) Assignee: Steris Inc., Temecula, CA (US)

( * ) Notice: Subject to any disclaimer, the term of this patent is extended or adjusted under 35 U.S.C. 154(b) by 0 days.

(21) Appl. No.: 10/899,866

(22) Filed: Jul. 27, 2004

(65) Prior Publication Data

US 2004/0262484 A1   Dec. 30, 2004

Related U.S. Application Data

(62) Division of application No. 10/288,149, filed on Nov. 5, 2002, now Pat. No. 6,817,585.

(60) Provisional application No. 60/337,830, filed on Nov. 5, 2001.

(51) Int. Cl.
*A47H 1/00* (2006.01)
*E04G 3/00* (2006.01)

(52) U.S. Cl. .................. 248/317; 248/276.1; 248/324; 248/343; 361/681

(58) Field of Classification Search ................ 248/317, 248/320, 324, 325, 278.1, 282.1, 503.1, 276.1, 248/343; 362/371, 147; 5/600, 503.1; 361/681, 361/682, 683
See application file for complete search history.

(56) References Cited

U.S. PATENT DOCUMENTS

| | | | |
|---|---|---|---|
| 2,448,001 A | 8/1948 | Maurette | |
| 2,456,997 A | 12/1948 | Sachs | |
| 2,459,034 A | 1/1949 | Kurger | |
| 2,507,308 A | 5/1950 | Kurger | |
| 3,240,925 A | 3/1966 | Paschke et al. | |
| 4,538,214 A | 8/1985 | Fisher et al. | |
| 4,673,154 A | 6/1987 | Karapita | |
| 4,993,683 A * | 2/1991 | Kreuzer | 248/639 |
| 5,038,261 A | 8/1991 | Kloos | |
| 5,377,371 A | 1/1995 | Foster | |
| 5,455,975 A * | 10/1995 | Foster | 5/600 |
| 5,490,652 A * | 2/1996 | Martin | 248/282.1 |

(Continued)

FOREIGN PATENT DOCUMENTS

EP   1 067419 A1   1/2001

(Continued)

*Primary Examiner*—Carl D. Friedman
*Assistant Examiner*—Tan Le
(74) *Attorney, Agent, or Firm*—Fay Sharpe LLP

(57) ABSTRACT

A medical suspension system (10) includes a ceiling plate (30) configured for mounting to a support structure (16). The ceiling plate supports a device (12), such as a lighthead or video monitor, which is mounted to the ceiling plate via an articulated arm (50) and a spindle (40), which is centrally mounted to the ceiling plate. A second device (14) is mounted to the ceiling plate, not through the spindle (40), in the conventional manner, but via an adapter plate (62), which is mounted directly to the ceiling plate. This increases the number of devices which are readily carried by the support structure without extending the spindle length which conventionally occurs when additional hubs are added to the main spindle.

21 Claims, 9 Drawing Sheets

U.S. PATENT DOCUMENTS

| | | |
|---|---|---|
| 5,618,090 A | 4/1997 | Montague et al. |
| 6,012,821 A | 1/2000 | Yeaney et al. |
| 6,030,103 A | 2/2000 | Gampe et al. |
| 6,089,518 A * | 7/2000 | Nilsson ..................... 248/317 |
| 6,095,468 A | 8/2000 | Chirico et al. |
| 6,213,481 B1 | 4/2001 | Marchese et al. |
| 6,343,601 B1 | 2/2002 | Kiske et al. |
| 6,364,268 B1 | 4/2002 | Metelski |
| 6,431,515 B1 | 8/2002 | Gampe et al. |
| 6,466,432 B1 | 10/2002 | Beger |
| 6,513,962 B1 | 2/2003 | Mayshack et al. |
| 6,793,380 B2 * | 9/2004 | Kupfer ..................... 362/371 |
| 6,817,585 B2 * | 11/2004 | Wagner et al. .............. 248/324 |

FOREIGN PATENT DOCUMENTS

| | | |
|---|---|---|
| FR | 1136512 | 5/1957 |
| FR | 2693102 | 1/1994 |

* cited by examiner

MEDICAL SUSPENSION SYSTEM WITH TWO SPINDLES

This application is a divisional application of U.S. patent application Ser. No. 10/288,149 filed Nov. 5, 2002 now U.S. Pat. No. 6,817,585, which claims priority of U.S. Provisional Application Ser. No. 60/337,830, filed Nov. 5, 2001.

BACKGROUND OF THE INVENTION

The present invention relates to the surgical lighting arts. It finds particular application in conjunction with mounting an auxiliary second spindle to a single ceiling plate supporting an existing first spindle in an operating room (OR) and will be described with particular reference thereto. It is to be appreciated, however, that the invention also finds application in conjunction with mounting other overhead secondary fixtures or devices to support systems that additionally support primary fixtures or devices and is not limited to the aforementioned OR application.

Typically, in an operating room setting, large, high lumen output lightheads are used to illuminate the surgical site. These rather large lightheads are supported on one or more jointed arms extending from a single central spindle attached to a ceiling plate. Each articulated arm is rotatable relative to the spindle and pivotable to allow independent positioning of the arms and their attached devices. The number of lightheads or other accessories (e.g., video monitors, EKG monitors) that can reasonably be supported in a stacked arrangement is limited by the height of the ceiling. Each additional support arm hub or accessory causes the central spindle to grow so that, the bottom end is lowered relative to the ceiling as additional arms are added. At some point, the length of the spindle presents an obstacle or hazard to those working in the OR.

When additional lightheads or accessories are desired, one option is to remove the existing ceiling plate that supports the central spindle and install a new ceiling plate adapted to support both the original central spindle as well as an auxiliary satellite spindle. This is only possible, however, in rooms with ceiling structures designed in advance for supporting the weight and moment of a two spindle system. In any case, the above procedure involves a major construction job during which time the operating room is removed from service.

The present invention provides a new and improved method and apparatus that overcomes the above referenced problems and others to provide an additional spindle utilizing an existing ceiling support.

SUMMARY OF THE INVENTION

In accordance with one aspect of the present invention, a suspension system for suspending a plurality of devices from a support structure is provided. The suspension system includes a ceiling plate configured for attachment to the support structure. A first spindle is carried by the ceiling plate. The first spindle is configured for supporting at least a first device thereon. An adapter plate is configured for mounting to the ceiling plate. A second spindle is carried by the adapter plate. The second spindle is configured for supporting at least a second device thereon.

In accordance with another aspect of the present invention, an auxiliary assembly is provided. The assembly includes an adapter plate configured for selective attachment to a ceiling plate. The ceiling plate supports a device for use in a surgical procedure. The adapter plate includes an inner surface which defines a hollow shaped to receive a spindle of the ceiling plate therethrough. An articulated arm is operably connected with the adapter plate. A device is mounted to the articulated arm, such that when the adapter plate is attached to the ceiling plate, the device is suspended therefrom.

In accordance with another aspect of the present invention, a method of suspending a plurality of devices from a support structure is provided. The method includes suspending a first device from a ceiling plate mounted to the support structure, mounting an adapter plate to the ceiling plate, and suspending a second device from the adapter plate.

One advantage of the present invention is that it enables a plurality of devices to be added to an existing support assembly without increasing the length of the central spindle.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
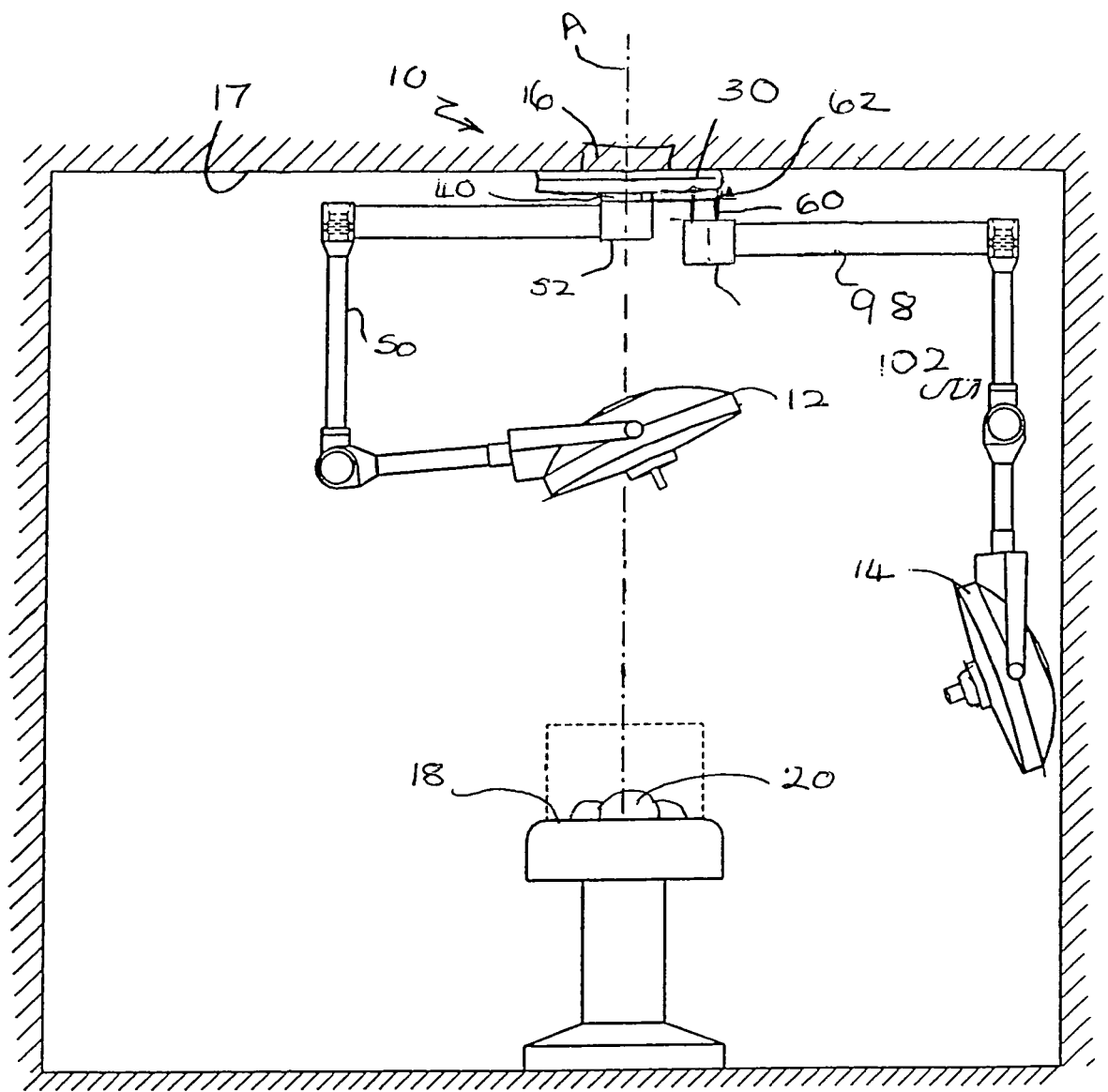
FIG. 1 is a side elevational view of a medical suspension system according to the present invention.

With reference to FIG. 1, a suspension system 10 suspends a plurality of medical devices 12, 14 from a rigid, immobile structural support 16, such as a ceiling support. The ceiling support 16 is preferably carried above a ceiling 17 by beams (not shown) or other rigid structures which support the ceiling of the operating room (OR) or are located above it such that the suspension system 10 extends below the ceiling. The medical devices 12, 14 illustrated in FIG. 1 are lightheads for illuminating a work surface 18, such as an operating table and a surgical site on a patient 20 supported thereon. However, it will be appreciated that a variety of other devices 12, 14 such as video monitors, vital sign monitors, and the like, are alternatively or additionally mounted on the suspension system 10.

Figure 2:
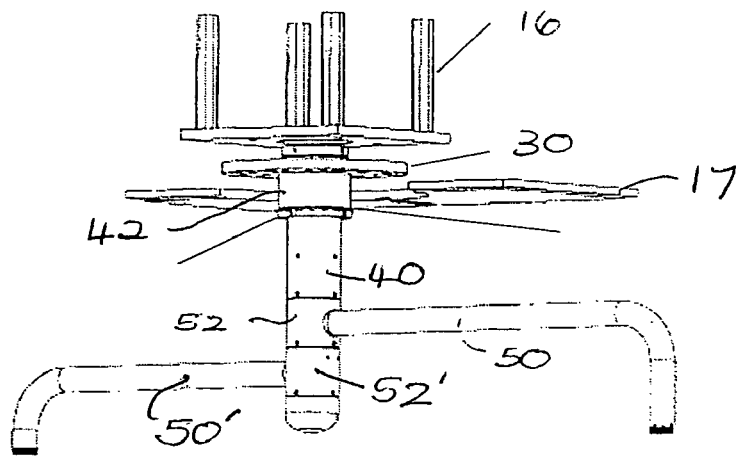
FIG. 2 is an enlarged side sectional view of a portion the medical suspension system of FIG. 1.
Figure 3:
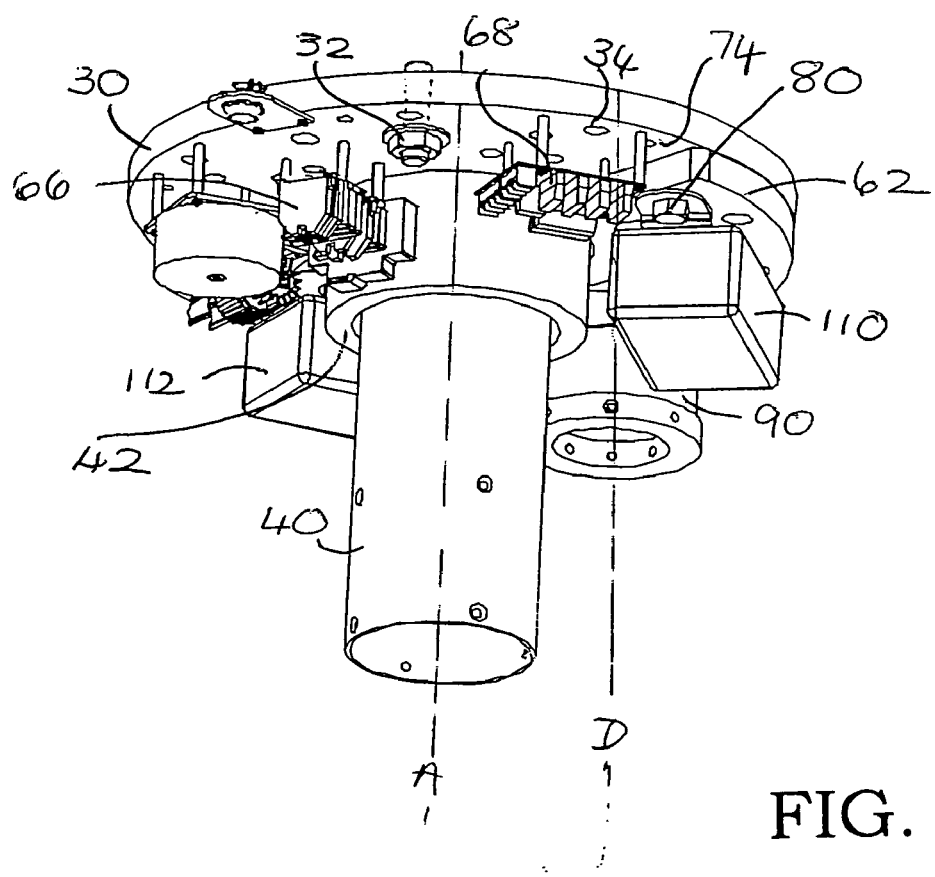
FIG. 3 is an enlarged perspective view of the ceiling plate, adapter plate, and central spindle of the medical suspension system of FIG. 1.
Figure 4:
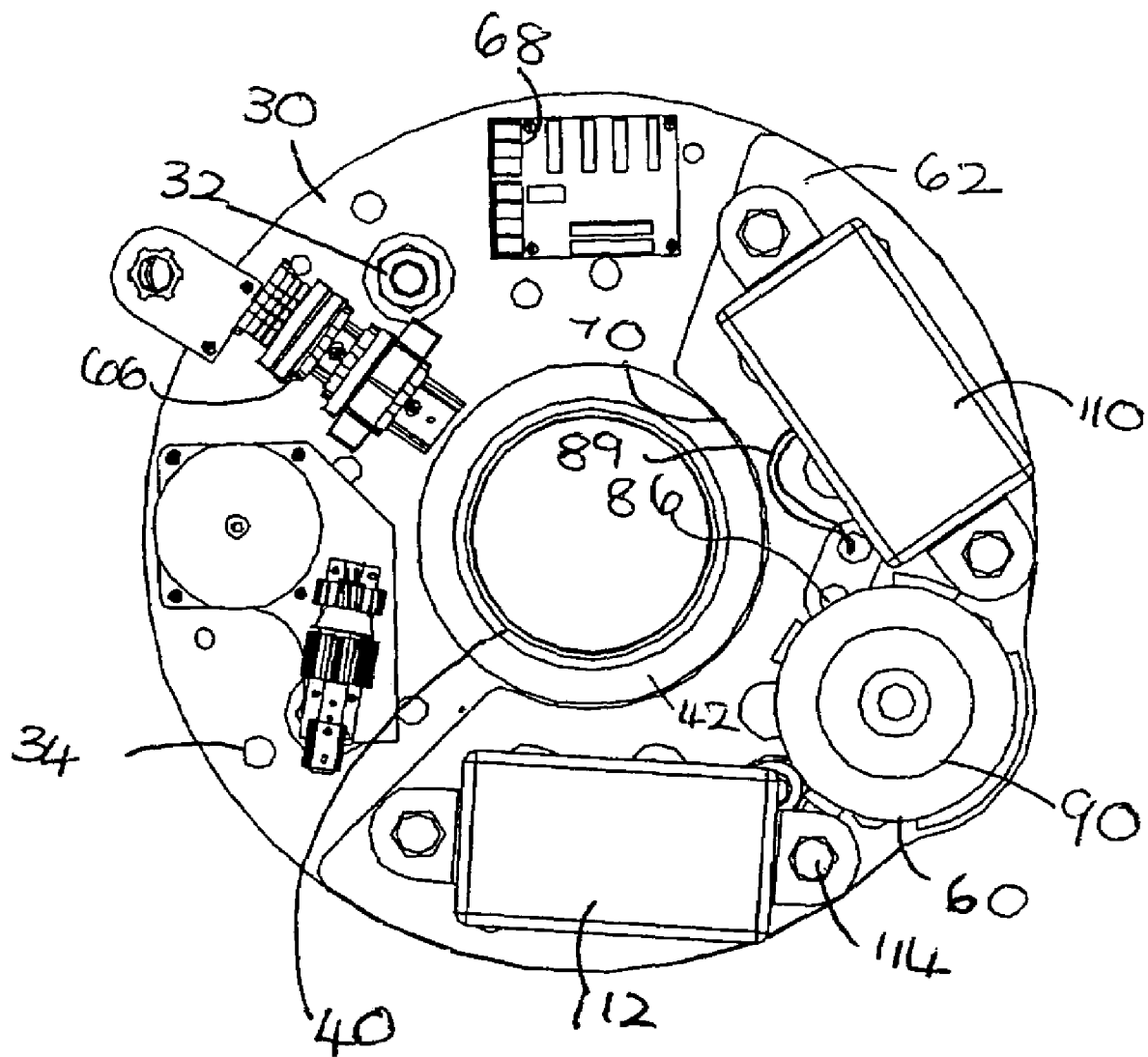
FIG. 4 is a top plan view of the ceiling plate, adapter plate, and central spindle of the medical suspension system of FIG. 3.

With reference also to FIGS. 2–4, the suspension system 10 includes a generally circular ceiling plate 30, which is secured to the ceiling support 16 or other immobile structural support by several suitable fixing members 32, such as bolts, screws, rivets, or the like, which are mounted by suitably positioned holes 34 through the ceiling plate 30. The ceiling plate 30 is formed from a rigid material such as iron or steel and is of sufficient strength to support the weight of the medical devices 12, 14, which are supported therefrom.

With continued reference to FIGS. 2–4, a first or central spindle 40 is secured to the ceiling plate 30. FIGS. 2–4 show the spindle 40 as being generally cylindrical in shape and being centrally mounted to a lower surface of the ceiling plate via a cylindrical collar 42 of slightly larger diameter than the spindle, which may be welded or otherwise rigidly fixed to the ceiling plate 30. The spindle 40 is bolted or otherwise rigidly attached to the collar 42. Other methods of fixing the central spindle to the ceiling plate known in the art are also contemplated.

With particular reference to FIGS. 1 and 2, an adjustable arm 50, such as a flexible and/or articulated arm is carried by the spindle 40 via a mounting hub 52. At least a portion of the mounting hub is rotatable, relative to the spindle. The arm 50 is thus movable to a selected position about an axis A of the ceiling plate 30. The first surgical support apparatus 12, such as a lighthead (as illustrated), video monitor, EKG monitor, or other vital system monitor is attached to a distal end of the arm 50. The arm 50 and the spindle 40 allow the surgeon to position the first surgical support apparatus 12 in a plurality of different positions and orientations as needed. As shown in FIG. 2, it is possible to extend the spindle 40 and add other devices 12 extending therefrom by stacking one or more additional spindle hubs along the axis A and thereby mounting one or more additional arms 50' (it will be appreciated that a single hub 52 optionally accommodates two or more arms 50). However, the number of devices 12 that can be added is generally limited by the length of the spindle 40 and the height of the ceiling 17 above the work surface 18.

Figure 5:
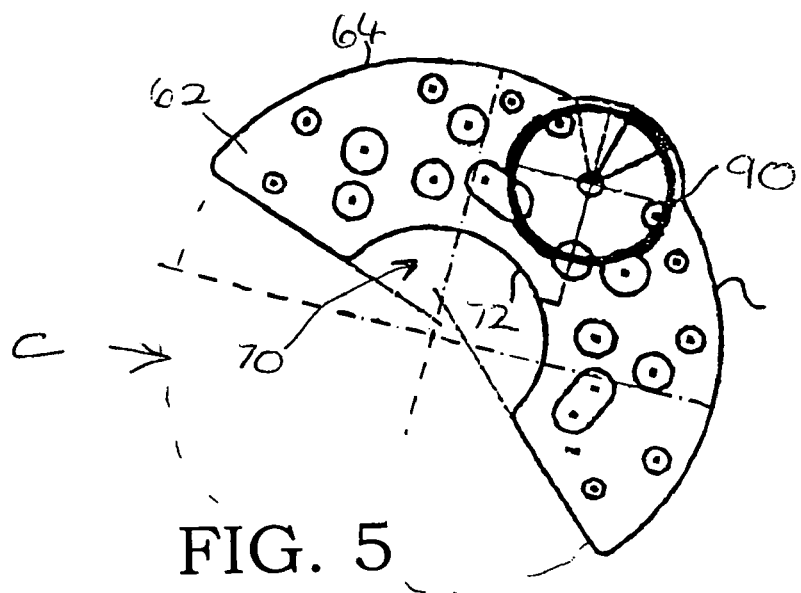
FIG. 5 is a bottom plan view of the adapter plate of FIG. 1.
Figure 6:
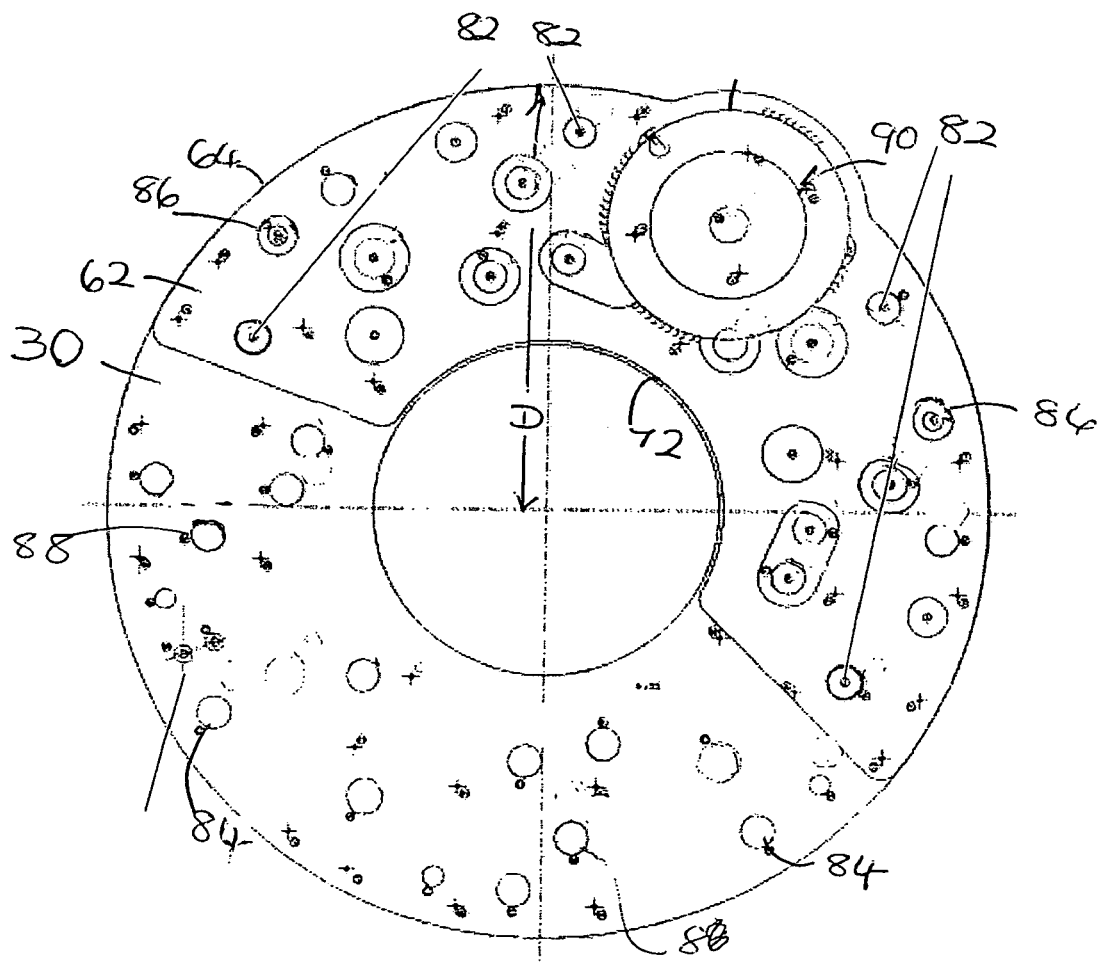
FIG. 6 is a bottom plan view of the adapter plate of FIG. 5 attached to the ceiling plate of FIG. 1.
Figure 7A:
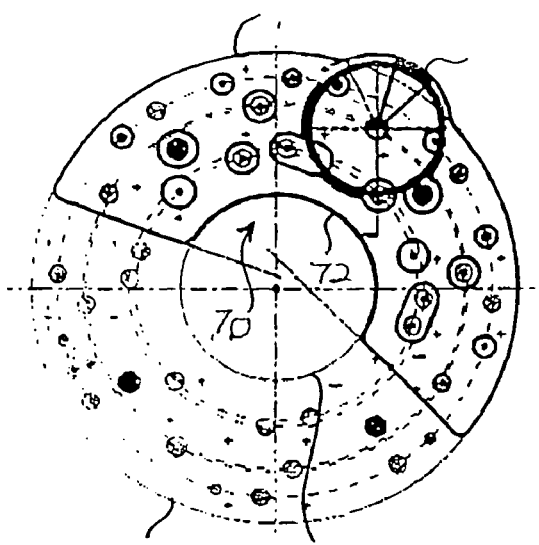
FIGS. 7A, 7B, 7C, and 7D are bottom plan views of four alternative mounting positions for the adapter plate of FIG. 5 on the ceiling plate of FIG. 6.
Figure 7B:
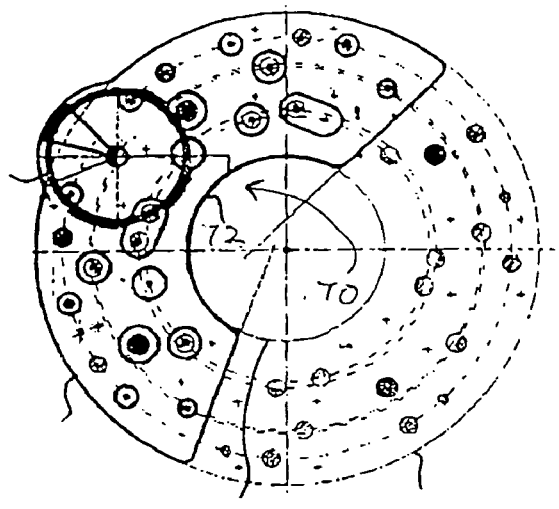
Figure 7C:
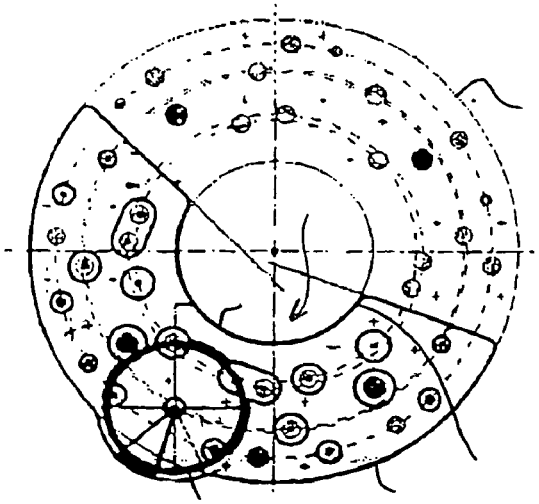
Figure 7D:
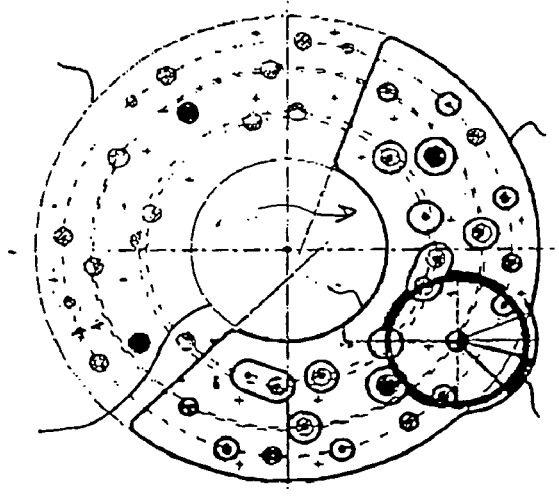

With reference to FIGS. 1 and 5–6, when it is desired to add a second spindle 60 to the system, an adapter plate 62 is attached directly to the existing ceiling plate 30. The adapter plate 62 is preferably in the shape of an incomplete circle and preferably has a diameter D substantially equal to a diameter of the ceiling plate 30. The adapter plate 62 defines an outer circumferential surface 64 which is preferably greater than 180° and less than 270° of an imaginary circle C of which it forms a part. This provides for the weight of the second device 14 to be distributed over a large area of the ceiling plate 30, while providing room for the attachment of other devices 66, 68, such as a control board and a fuse block, directly to the ceiling plate (see FIGS. 3–4). The adapter plate 62 defines an arcuately shaped hollow portion 70, spaced radially inward from the circumferential surface 64, that accommodates the main spindle 40 and collar 42 therethrough. In order to accommodate the spindle 40 and collar 42 and present a circumferential surface 64 which is larger than half of the ceiling plate 30, an inner edge 72 of the adapter plate 62 preferably spans less than or equal to 180° around the spindle 40, so that the adapter plate 64 may fit snugly against the spindle collar 42 and partially surround the spindle 40 without obstructing its own access to the spindle 40.

As shown in FIGS. 2, 3 and 6, the adapter plate 62 is fixed directly to the ceiling plate 30. A lower surface 74 of the ceiling plate preferably lies flat against an adjacent, upper surface of the adapter plate although it is also contemplated that spacing members may be interposed between the ceiling plate and adapter plate. Suitable securement members 80, such as nuts and bolts, screws, rivets, or other attachment mechanisms, are mounted through suitably positioned holes 82 in the adapter plate and corresponding holes 84 in the ceiling plate to secure the plates 30, 62 together.

Preferably, the adapter plate 62 is selectively positionable so that the second spindle 60 is locatable in one of a plurality (four in the illustrated embodiment) of possible positions around the main spindle 40, each position being arcuately spaced (90° in the illustrated embodiment) from the next position around the main spindle 40, as illustrated in FIGS. 7a–7d. Accordingly, the ceiling plate 30 is provided with sufficient mounting holes 84 to allow the adapter plate to be mounted in any one of the selected positions. This enables optimum positioning of the second spindle 62 and its associated device 14 with respect to the OR and equipment in the OR, e.g., where it will best benefit the surgeon, without interfering with positioning of devices 12 supported on the first spindle 40. Additionally, when the adapter plate 62 is located in any one of the four selected positions, electrical wiring feed through holes 86 in the adapter plate are aligned with corresponding holes 88 in the ceiling plate 30 so that electrical wiring 89 and the like for providing power or communicating with the device 12 can be passed through both the adapter plate 62 and ceiling plate 30. Other sizes or configurations of the adapter plate 62 are optionally provided, for example, auxiliary spindle positions at angular increments other than 90°.

Figure 8:
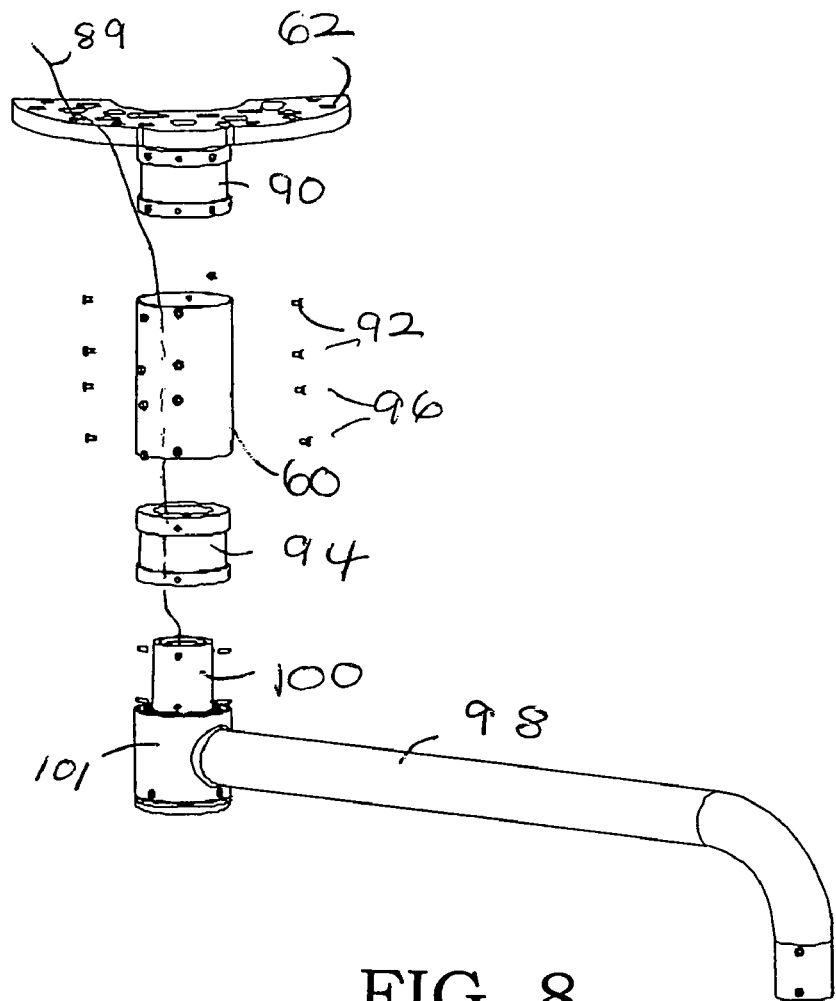
FIG. 8 is an exploded perspective view of the adapter plate, spindle, and associated articulated arm of FIG. 1.
Figure 9:
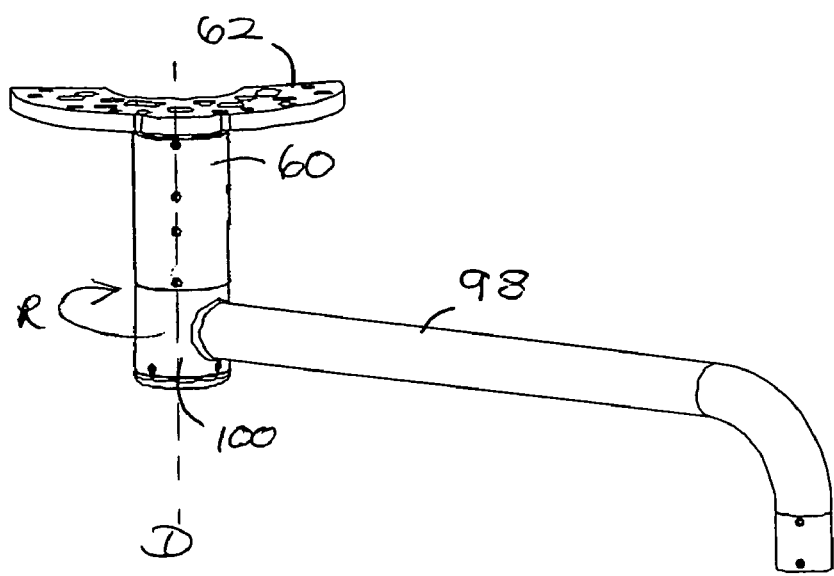
FIG. 9 is a perspective view of the adapter plate, spindle, and associated articulated arm of FIG. 8.

The second spindle 60 is fixedly attached to the adapter plate 62 in a similar manner to the way in which the main spindle 40 is attached to the ceiling plate 30. As best shown in FIGS. 8 and 9, the adapter plate includes a collar 90, analogous to the collar 42 for the main spindle 40. In the case of the auxiliary spindle 60, the spindle is mounted exteriorly of the collar 90, by securement members 92, such as screws, bolts, or the like, although it will be appreciated that the collar 90 may be radially outward of the spindle 60, as for the main spindle. In yet another embodiment, the collar is eliminated and the spindle is mounted directly to the adapter plate, for example by welding or with suitable securement means, such as bolts, screws, rivets, or the like.

The spindle may include a cylindrical mounting member 94, which is received in an opposite end of the spindle 60 to the collar 90 and attached thereto by similar securement members 96. A similar cylindrical mounting member (not shown) is optionally also associated with the main spindle. A second adjustable arm 98, analogous to arm 50, is mounted at a proximal end or hub 100 thereof to the spindle 60 via the cylindrical member 94. At least a portion 101 of the hub 100 is rotatable relative to the spindle, as shown by arrow R, about an axis D through the spindle (FIG. 9).

The second device 14 is mounted to a distal end of the arm 98. As for the first spindle 40, additional arms (not shown) are optionally mounted to the spindle 60 in a similar manner to that shown in FIG. 2. The adapter plate 62, device 14, arm 98, and interconnections therebetween comprise an auxiliary assembly 102, which may be provided as an assembled unit for attachment to the ceiling plate 30, or as separate components for assembly at the OR site.

As will be appreciated, the first device 12 is carried solely by the ceiling plate 30 (i.e., not by the adapter plate 62) while the second device 14 is carried by both the ceiling plate and the adapter plate. When the support system 10 is assembled, the two spindles 40, 60 are arranged generally side-by-side, i.e., the second spindle 60 is positioned generally parallel with and radially spaced from the main spindle 40, such that at least a portion of each spindle 40, 60 lies on the same horizontal plane axially spaced from the ceiling plate 32. In this way, as additional hubs 100 are added to the second spindle 60, the length of the first spindle 40 is not increased and the available working height between the work surface 18 and the lowest hub 100 is maintained (unless several hubs are added to the second spindle, resulting in the second spindle and its associated hubs 100 being lower than that of the first spindle).

As shown in FIGS. 3 and 4, other devices 110, 112 are optionally mounted to the adapter plate using securement members 114, such as bolts, screws, or the like, which are received through suitably positioned holes in the adapter plate and preferably also through corresponding holes in the ceiling plate 30.

Figure 10:
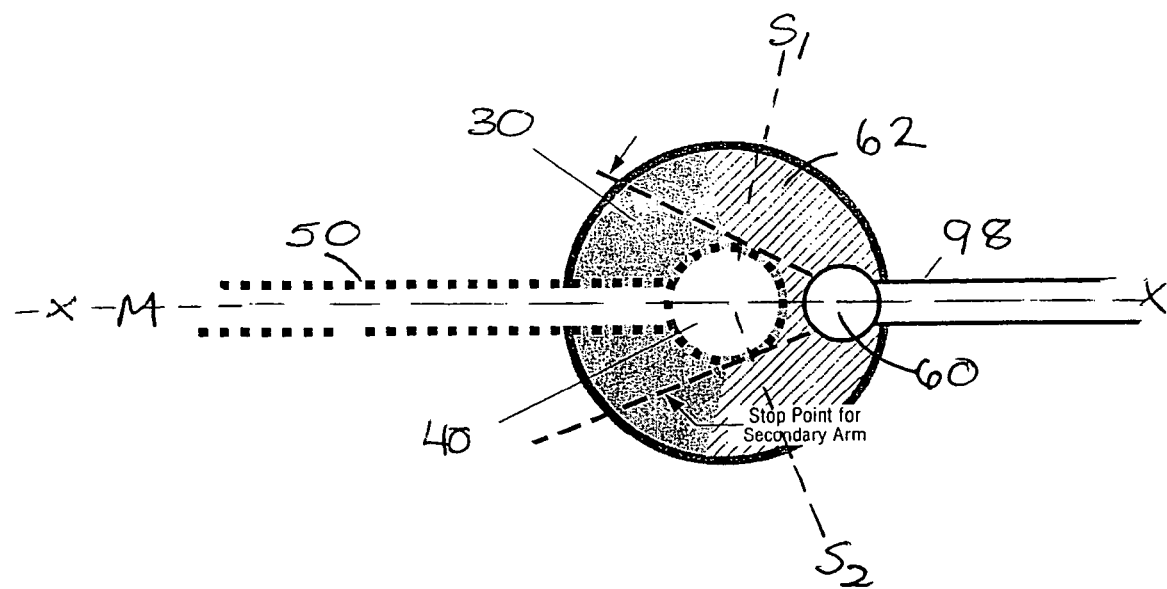
FIG. 10 is a schematic view demonstrating the positioning of the second spindle.

With reference now to FIG. 10, to select the optimum position for the adapter plate 62 out of the plurality of possible positions (four in the illustrated embodiment), the arm 50 of the first device 12 is moved between its stop positions $S_1$ and $S_2$ and the midpoint M between the stop positions is determined as being the most typical operating position for the arm 50. The second spindle 60 is then positioned at or about 180° from the midpoint (i.e., at an opposite end of a line x—x passing through the midpoint M and the first spindle 40). In this way, the arms 50 and 98 will be in the positions least likely to interfere with each other during positioning.

Figure 12:
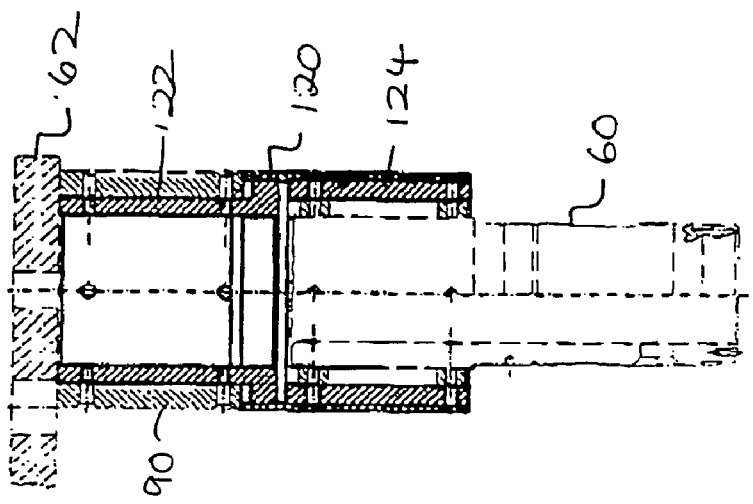
FIG. 12 is a cross sectional view of the adapter plate of FIG. 11 mounted to the spindle with a telescoping transition piece in a collapsed position.
Figure 11:
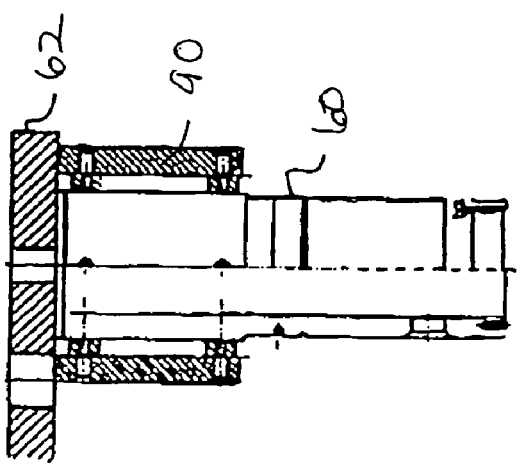
FIG. 11 is a cross sectional view of the adapter plate of FIG. 1 mounted to the spindle without a telescoping transition piece.

In order to accommodate for variable ceiling heights, a telescopic transition piece 120 (FIGS. 12–13) is optionally used for installation concurrently with the adapter plate 62. The transition piece 120 is extended fully for high ceilings (FIG. 13), and extends to varying lesser lengths for varying heights of lower ceilings between the extended position and a collapsed position (FIG. 12). The transition piece 120 may not be needed if the ceiling in the application is low enough (FIG. 11). In that case, the second spindle 60 is simply attached directly to the adapter plate collar 90. The transition piece 120 enables the adapter plate 62 to be installed in a variety of different settings without having to adjust the dimensions of the support arm 98.

Figure 13:
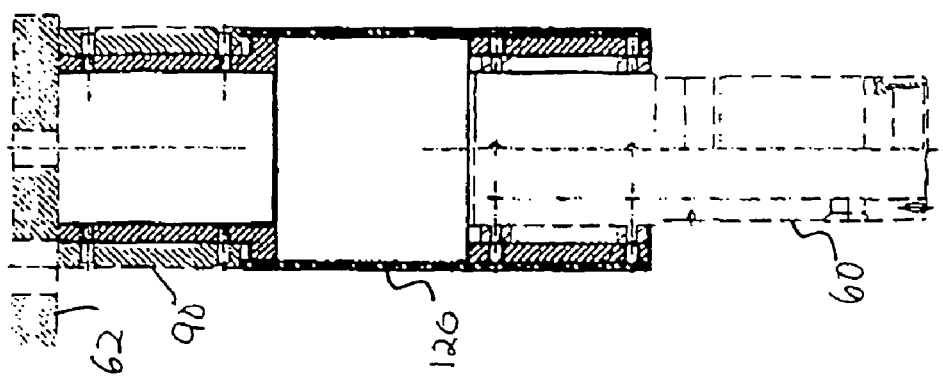
FIG. 13 is a cross sectional view of the adapter plate of FIG. 12 mounted to the spindle with the telescoping transition piece in an expanded position.

As shown in FIGS. 12 and 13, the transition piece 120 includes a first attachment portion 122 at an upper end thereof, which is attached to the collar 90 in place of the spindle 60 by suitable securement means, such as bolts, screws, or the like (not shown). A second attachment portion 124 is attached to the spindle 60 in a similar manner. A telescoping midportion 126, intermediate the two attachment portions 122, 124, extends the length of the transition piece between that shown in FIG. 12 and that shown in FIG. 13.

Figure 14:
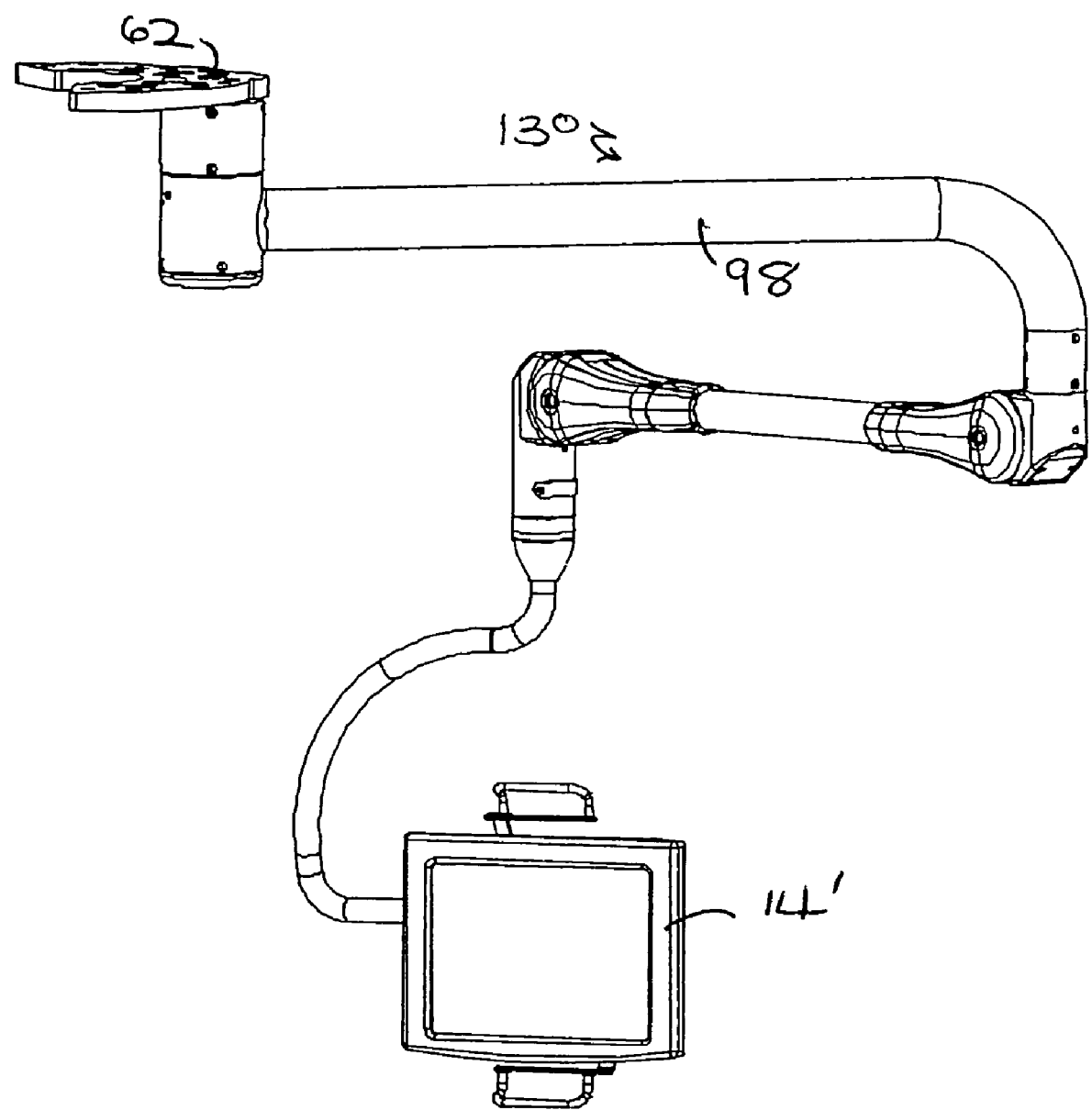
FIG. 14 is a perspective view of an alternative embodiment of a device suspended from an adapter plate according to the present invention.

With reference to FIG. 14, an alternative auxiliary assembly 130 comprising an adapter plate 62 an articulated arm 98 and a monitor 14' is shown.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention in now claimed to be:

1. A method of suspending a plurality of devices from a support structure, the method comprising:
    suspending a first device from a first spindle extending from a ceiling plate mounted to the support structure;
    providing an adapter plate having an arcuately shaped hollow portion defining an inner arcuate surface of less than about 180° of an imaginary circle inscribing the inner arcuate surface and being configured for mounting to the ceiling plate in a plurality of positions around the ceiling plate, each of the plurality of positions being arcuately spaced from the next position;
    mounting the adapter plate to the ceiling plate at a selected one of said plurality of positions around the ceiling plate and with the hollow portion of the adapter plate at least partially surrounding said first spindle; and,
    suspending a second device from the adapter plate.

2. The method of claim 1, wherein suspending the second device includes:
    rotatably mounting an articulated arm to a spindle, the spindle being mounted to the adapter plate.

3. The method of claim 1, wherein the ceiling plate includes a plurality of holes and the adapter plate includes a plurality of holes and mounting an adapter plate to the ceiling plate includes:
    passing securement means through at least some of the plurality of holes in the ceiling plate and at least some of the holes in the adapter plate.

4. The method according to claim 1, wherein said mounting includes attaching said adapter plate directly to said ceiling plate.

5. The method according to claim 4, wherein the ceiling plate includes a lower surface and the adapter plate includes an upper surface, and wherein:
    said mounting includes disposing the lower surface of the ceiling plate against the upper surface of the adapter plate.

6. The method according to claim 1, wherein said mounting includes interposing spacing members between the ceiling plate and the adapter plate.

7. A method of suspending a plurality of devices from an associated support structure comprising:
    providing a suspension system including:
        a ceiling plate configured for attachment to the associated support structure;
        a first spindle, carried by the ceiling plate, the first spindle configured for supporting at least a first device thereon;
        an adapter plate configured for mounting to the ceiling plate in a plurality of positions around the first spindle carried by the ceiling plate, each of said plurality of positions being arcuately spaced from the next position around said ceiling plate, the adapter plate having a hollow portion adapted to receive the first spindle therein; and a second spindle carried by the adapter plate, the second spindle configured for supporting at least a second device thereon;

supporting said first device from said first spindle;

mounting said adapter plate to said ceiling plate in one of said plurality of positions; and, supporting said second device from said second spindle.

8. The method according to claim 7, wherein said mounting includes attaching said adapter plate directly to said ceiling plate.

9. The method according to claim 7, further including interposing spacing members between said ceiling plate and said adapter plate.

10. A method of suspending a plurality of devices from a support structure in a suspension system including a ceiling plate configured for attachment to the support structure, and a first spindle, carried by the ceiling plate, the first spindle configured for supporting at least a first device thereon, the method comprising:

providing an adapter plate configured for mounting to the ceiling plate, and a second spindle attached with the adapter plate, the second spindle configured for supporting at least a second device thereon and the adapter plate having a hollow portion which is shaped to receive the first spindle, the hollow portion defining an inner arcuate surface of less than about 180° of an imaginary circle inscribing the inner arcuate surface, wherein the adapter plate and ceiling plate are configured for connection of the adapter plate with the ceiling plate in a selected one of a plurality of arcuately spaced positions;

supporting said first device from said first spindle;

mounting said adapter plate to said ceiling plate in one of said plurality of positions; and, supporting said second device from said second spindle.

11. A method of suspending a plurality of devices from an associated support structure in an associated suspension system including a ceiling plate configured for attachment to the support structure and a first spindle carried by the ceiling plate, the first spindle configured for supporting at least a first device thereon, the method comprising;

providing an adapter plate configured for mounting to the ceiling plate in a selected one of a plurality of arcuately spaced positions around the first spindle carried by the ceiling plate, the adapter plate carrying a second spindle and having a hollow portion adapted to at least partially surround the first spindle;

supporting said first device from said first spindle;

mounting said adapter plate to said ceiling plate in one of said plurality of arcuately spaced positions with the first spindle in said hollow portion; and, supporting a second device from said second spindle.

12. The method of claim 11, wherein said providing said adapter plate includes providing an adapter plate having arcuate portions.

13. The method of claim 12, wherein said providing said adapter plate includes providing an adapter plate having an area in operative engagement with said ceiling plate for distributing a weight of said spindle and said second device over a corresponding area of said ceiling plate.

14. The method according to claim 11, wherein said mounting includes mounting said adapter plate directly to said ceiling plate.

15. The method according to claim 11, wherein said mounting includes interposing a spacing member between said adapter plate and said ceiling plate.

16. A method of suspending a plurality of devices from an associated support structure in an associated suspension system including a ceiling plate configured for attachment to the support structure and a first spindle carried by the ceiling plate, the first spindle configured for supporting at least a first device thereon, the method comprising:

providing an adapter plate configured for mounting to the ceiling plate in a selected one of a plurality of spaced positions, the adapter plate carrying a second spindle and having a hollow portion adapted to at least partially surround the first spindle, the hollow portion defining an inner arcuate surface of less than about 180° of an imaginary circle inscribing the inner arcuate surface;

supporting said first device from said first spindle;

mounting said adapter plate to said ceiling plate in one of,said plurality of positions with the first spindle in said hollow portion; and, supporting a second device from said second spindle.

17. A method of suspending a plurality of devices from an associated support structure in an associated suspension system including a ceiling plate configured for attachment to the support structure and a first spindle carried by the ceiling plate, the first spindle configured for supporting at least a first device thereon, the method comprising:

providing an adapter plate configured for mounting to the ceiling plate in a selected one of a plurality of spaced positions, the adapter plate carrying a second spindle and having a hollow portion adapted to at least partially surround the first spindle and having an outer circumferential surface greater than about 180° and less than about 270° of an imaginary circle;

supporting said first device from said first spindle;

mounting said adapter plate to said ceiling plate in one of said plurality of positions with the first spindle in said hollow portion; and, supporting a second device from said second spindle.

18. A method of suspending a plurality of devices from an associated support structure, the method comprising:

suspending a first device from a fist spindle extending from a ceiling plate mounted to the associated support structure;

mounting an adapter plate to the ceiling plate by selecting a first position from a plurality of positions around the ceiling plate, each of the plurality of positions being arcuately spaced from the next position, and attaching the adapter plate to the ceiling plate in said selected first position, the adapter plate having an arcuately shaped hollow portion receiving said first spindle therethrough; and, suspending a second device from the adapter plate.

19. The method of claim 18, wherein said mounting includes mounting said adapter plate to fit snugly against said first spindle.

20. The method according to claim 18, wherein said mounting includes mounting said ceiling plate directly to said adapter plate.

21. The method according to claim 18, wherein said mounting includes interposing a spacing member between said ceiling plate and said adapter plate.

* * * * *